UNITED STATES PATENT OFFICE.

THOMAS G. HOJER, OF NEW YORK, N. Y.

PRESERVATIVE DRIER.

SPECIFICATION forming part of Letters Patent No. 501,227, dated July 11, 1893.

Application filed December 7, 1892. Serial No. 454,388. (No specimens.)

*To all whom it may concern:*

Be it known that I, THOMAS G. HOJER, a citizen of the United States, and a resident of the city, county, and State of New York, have invented certain Improvements in Preservative Driers for Use in the Manufacture of Varnishes of All Kinds, of which the following is a specification.

My invention relates to a composition of matter for use as a drier of oils and varnishes, and especially for use in the manufacture of varnishes. I prepare this compound, preferably, by mixing together certain ingredients and allowing them to react on each other chemically in order to produce in the compound the ingredients required; but I do not claim the mode of producing the composition of matter hereinafter described nor limit myself to said mode.

In carrying out my invention in the manner preferred, I take about equal parts of dry powdered and slaked lime, a soluble salt of manganese, and water. I prefer to employ lime slaked with just enough water to convert it into a powder, and to employ either the sulphate or the chloride of manganese; either of these will produce good results. The manganese salt is first dissolved in the water, and then slowly added to the lime while the mass is stirred. For mixing the ingredients, I prefer to employ a mechanical mixer. At first the mass will be grayish white in color, but as the stirring slowly progresses oxygen is taken up and the color changes to a very dark gray. The operation will then be complete and the mixture is taken out of the mixer, dried and powdered and it is ready for use by the varnish maker. The color attained by the mixture when sulphate of manganese is employed, will be a very dark gray but when the chloride is employed, it will usually have a brownish gray tint, probably from some of the chloride remaining unchanged. The operation is complete when the color of the mixture has reached its deepest or darkest tint.

I have stated that the ingredients may be mixed in about equal proportions, which will leave a considerable percentage of the lime uncombined. This is desirable for reasons that will be explained. When the ingredients are mixed as described, manganese sulphate will combine with the lime in about the proportion of one hundred and fifty-one parts of the sulphate to seventy-four parts of lime, and the mixture will contain, after the reaction, calcium sulphate, hydrated manganese dioxide, and free lime. If manganese chloride is employed, it will combine with the lime in about the proportion of one hundred and twenty-six parts of the chloride to seventy-four parts of lime, and the mixture will contain, after reaction, calcium chloride, hydrated manganese dioxide and free lime. If the lime be supplied in such proportion that no free lime is left in the mixture after reaction, the drier will not work effectively, for the reason that the fatty acids will not be neutralized. The free lime combines with these acids to form a lime soap, and the drier thus serves as a clarifying agent for the oils used by the varnish maker.

I may state here that in clarifying oil for use in the best varnishes, ordinarily the oil is heated, skimmed, allowed to simmer for some hours, and then allowed to stand for several months so that the impurities may subside. But by the use of the drier herein described the linseed oil is clarified, the fatty acids neutralized, and the oil converted into a clear, hard drying oil. This oil, as a vehicle for the harder resins, renders the varnishes elastic, durable and brilliant. This is the manner of using the drier when linseed oil is treated therewith.

I may say here that while there should be some free lime in the drier as prepared for use, I do not limit myself to exact proportions of the ingredients, as exactness is not essential to the attainment of good results.

The usual mode of employing a drier in the manufacture of varnishes is to first fuse and prepare the gum or resin, then add linseed or other oil and heat the mass until they are thoroughly combined; the drier is then added and stirred while cooking. However, the drier may be employed in the primary preparation of the gums and resins to be used by the varnish maker, and I contemplate employing my drier in this primary preparation of the gums and resins for the makers of varnishes.

For dissolving the manganese salt I prefer to use clear cold water which may be boiled before using.

I am well aware that manganese salts have been before used in the preparation of driers and I do not broadly claim their use for such purposes; and I am also aware that a compound of borate of lime with sulphate or acetate of manganese has been used as a drier for paints, and I make no claim to this. Such a compound will not serve for use in making varnishes where the materials must be heated up to about 480° Fahrenheit in combination with the drier.

My drier is not designed for use by painters to mix with oils and paints at normal temperatures.

Having thus described my invention, I claim—

A composition of matter for use as a drier, comprising hydrated manganese dioxide, calcium hydrate, and a calcium salt, substantially as set forth.

In witness whereof I have hereunto signed my name in the presence of two subscribing witnesses.

THOMAS G. HOJER.

Witnesses:
HENRY CONNETT,
PETER A. ROSS.